Dec. 8, 1942.                R. LEE                2,304,185
                             BROACH
                       Filed Jan. 4, 1941
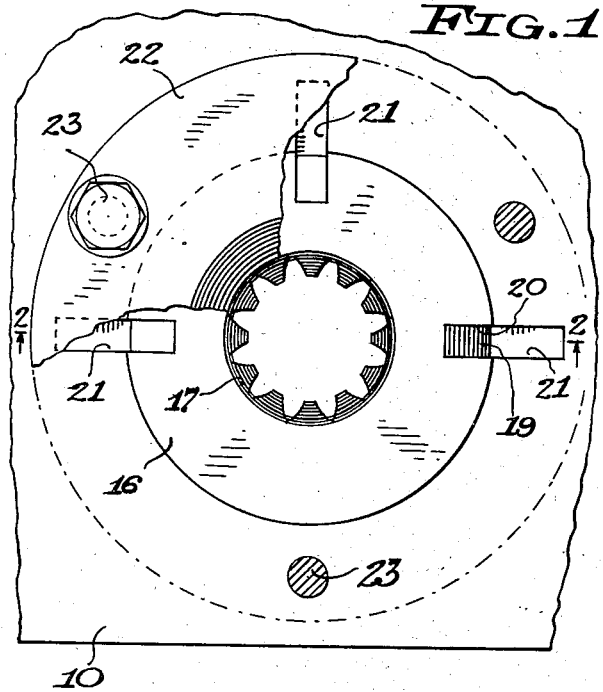
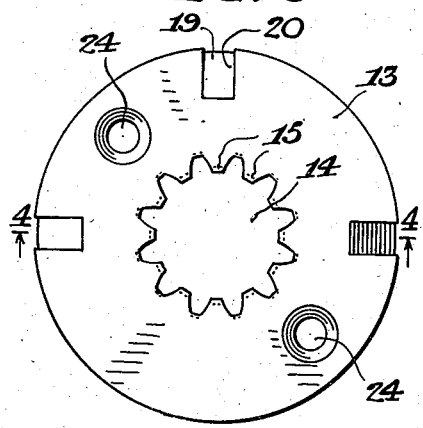
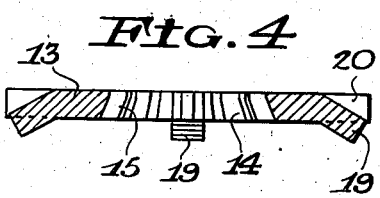
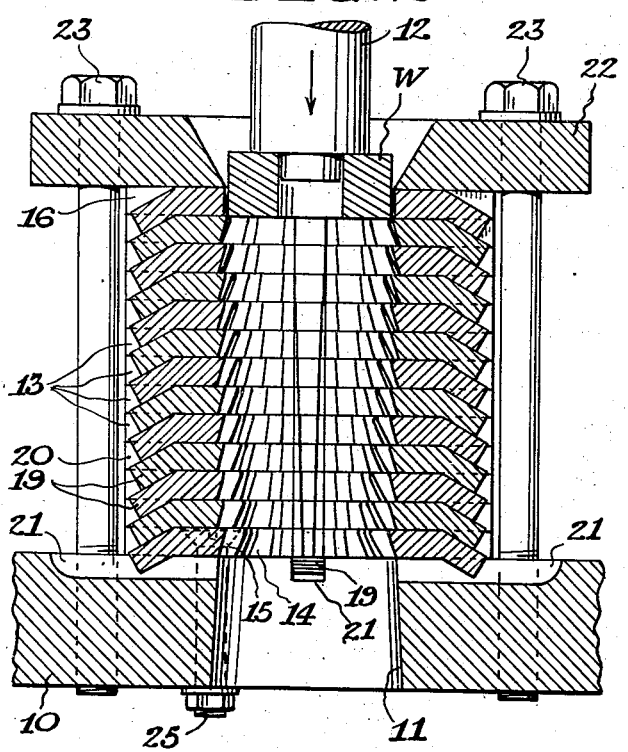
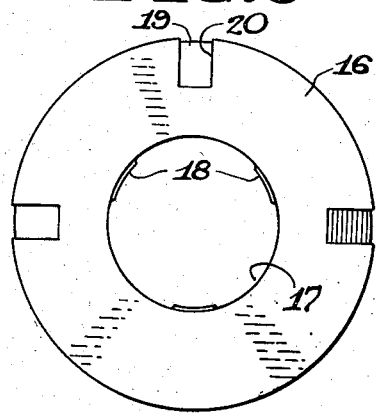
INVENTOR
ROYAL LEE
BY Christopher L. Waal
ATTORNEY Patented Dec. 8, 1942

2,304,185

UNITED STATES PATENT OFFICE 2,304,185

BROACH

Royal Lee, Milwaukee, Wis.

Application January 4, 1941, Serial No. 373,130

7 Claims. (Cl. 29—95.1)

The present invention relates to broaching tools and more particularly to tools of the type adapted for shaping exterior surfaces on a work-piece.

In the manufacture of externally toothed spur gears, it has been customary to cut the gear teeth in succession by means of a hobbing machine or other similar machine.

It is an object of the present invention to provide an improved form of broach by which gears of this type, and other work-pieces, may be inexpensively and expeditiously produced.

Another object of the invention is to provide a broach which is so arranged as to facilitate the shaping and sharpening of interior cutting portions and the renewal of worn parts.

A further object is to provide a broach including a series or stack of cutting sections and having simple but effective means for aligning these sections.

A still further object is to facilitate the mounting of the broach on a broaching machine.

The invention further consists in the several features hereinafter described and claimed.

In the accompanying drawing, illustrating one specific embodiment of the invention, Fig. 1 is a top view of a broach constructed in accordance with the invention and applied to a broaching machine, parts being broken away and parts being shown in section;

Fig. 2 is a sectional elevation of the broach taken generally along the line 2—2 of Fig. 1, a work-piece being shown in position to be forced through the broach by a pressing member of the machine;

Fig. 3 is a top view of one of the plate-like broach elements for the finishing end of the tool;

Fig. 4 is a sectional elevation of the broach element of Fig. 3, taken generally along the line 4—4 of Fig. 3, and Fig. 5 is a top view of a work-centering element forming part of the broach.

In the drawing, 10 designates the table of a broaching machine, this table having an opening 11 to pass the finished work, not shown. Above the table and in vertical alignment with the opening is the ram or pressing element 12 of the machine, Fig. 2.

The broach of the invention comprises a series or stack of cutting sections or elements 13 in the form of flat metal plates of annular shape having aligned central apertures 14 provided with inwardly projecting cutting teeth 15, the teeth of the downwardly succeeding plates decreasing in effective radius but increasing in radial depth. In some instances, the stack of plates may be surmounted by a similar plate 16, Figs. 2 and 5, forming a centering or pilot device for the entering work-piece W, the aperture 17 of this plate having angularly spaced sloping lands 18 to position the work-piece. By way of example, the work-piece W is here shown to be a spur gear blank, and the cutting teeth of the broach are formed to produce the desired contour of the finished gear.

In order to align the stacked plates 13 and 16, the marginal portion of each plate is provided with a plurality of downwardly projecting angular tongues 19 formed or struck-up as by means of a stamping and swaging operation. Each of the bent tongues 19 has parallel sides and extends radially of the plate. Two of the tongues are here shown to be at diametrically opposite points of the periphery of the plate, while a third tongue is spaced 90° from the opposed tongues. The angular space above each tongue presents a parallel-sided recess or notch 20 within which closely fits the corresponding tongue of the superposed plate. In each plate, the planes of the flat parallel sides of each tongue and associated notch extend in parallel relation to the axis of the plate and at right angles to the top and bottom planes of the plate. The unsymmetrically placed tongues will insure the proper angular positioning of the stacked plates. The marginal location of the tongues facilitates the formation and accurate shaping of the tongues. The tongues of the lowermost plate fit in radial grooves 21 formed in the table 10 of the broaching machine, thus aligning the stack of plates with respect to the table opening 11 and the ram 12. The table grooves will accommodate the tongues of broach plates of different diameters. The stacked broach plates are clamped together and to the table as by means of a superposed annular clamping plate 22 secured to the table by bolts 23. In some instances the lowermost broach plate may be provided with openings 24, Fig. 3, to permit attachment of this plate to the table 10 by means of bolts 25, one being shown in Fig. 2.

In operation, the work blank W is placed in the annular centering plate 16 and is forced downwardly through the successive annular cutting plates 13 of the broach to form a finished spur gear, this gear then passing through the opening 11 in the table 10. The ram 12 is then raised for operating on the next work-piece. At intervals the chips which accumulate in the clearance spaces of the broach are blown out or otherwise removed. The lower cutting plates of the broach form finishing elements and may in many instances have a burnishing action so as to remove tool marks and to improve the finish on the gear teeth. If the gear blank has its outer diameter finished to size it will not be necessary to remove material from the outer ends of the gear teeth. The finished gear has the contour of the aperture in the lowermost broach plate, shown in Fig. 3.

In the present instance, the broach is shown to be stationary and the work movable, but it will be obvious that either of these members may be moved with respect to the other. It will also be obvious that the broach may be mounted in various positions, depending on the construction of the broaching machine.

In the manufacture of the broach the internal cutting teeth are readily shaped and sharpened since they are formed on the several separable plates 13. After wear has occurred the teeth can be sharpened by flat-grinding the upper surfaces of the plates, which is a relatively simple operation. The useful life of the broach can be extended at relatively low cost by merely adding one or two broach plates at the lower end of the stack, without discarding the original plates.

The broach of the invention permits externally toothed spur gears to be inexpensively produced, and dispenses with the use of a hobbing operation. While the broach is particularly intended for use in forming gears, it is also applicable to the manufacture of other work-pieces which are to be externally shaped.

What I claim as new and desire to secure by Letters Patent is:

1. A broach comprising a series of members having aligned apertures and having cutting portions at said apertures, said apertured members being adapted to receive a work-piece therethrough to be cut by said cutting portions, and said members having interengaging parts to align said members, said interengaging parts including struck-up projections on said members.

2. A broach comprising a series of members having aligned apertures and having cutting portions at said apertures, said apertured members being adapted to receive a work-piece therethrough to be cut by said cutting portions, and said members having parallel-sided struck-up projections and recesses formed by the displacement of said projections, the projections and recesses of adjacent members interfitting with each other to align said members.

3. A broach comprising a series of stacked plates having aligned apertures and having cutting portions at said apertures, said apertured plates being adapted to receive a work-piece therethrough to be cut by said cutting portions, and said plates having laterally projecting struck-up tongues and notches at the marginal portions thereof, the tongues and notches of adjacent plates interfitting with each other to align said plates, each tongue and the notch interfitting therewith having opposite flat parallel side walls extending parallel to the axis of the stacked plates, and the tongues of each plate extending in different directions from said axis.

4. A broach comprising a series of stacked plates having aligned apertures and having cutting portions at said apertures, said apertured plates being adapted to receive a work-piece therethrough to be cut by said cutting portions, each of said plates having laterally projecting struck-up parts at one face thereof and recesses opening at the other face and having said cutting portions extending to said last-named face, the projecting parts and recesses of adjacent plates interfitting with each other to align said plates.

5. A broach comprising a series of stacked plates having aligned apertures and having cutting portions at said apertures, said apertured plates being adapted to receive a work-piece therethrough to be cut by said cutting portions, each of said plates having angularly deflected parallel-sided marginal tongues projecting laterally thereof and parallel-sided notches formed by the deflection of said tongues, the tongues of each plate extending in different directions from the axis of the plate, and the tongues and notches of adjacent plates interfitting with each other to align said plates.

6. A broach comprising a series of members having aligned apertures and having cutting portions at said apertures, said apertured members being adapted to receive a work-piece therethrough to be cut by said cutting portions, and said members having interengaging parts to align said members, said parts including struck-up projections on said members, and an apertured supporting member for one end of said series of cutting members having recesses to receive and position the projecting aligning parts of the adjacent member.

7. A broach comprising a series of members having aligned apertures and having cutting portions at said apertures, said apertured members being adapted to receive a work-piece therethrough to be cut by said cutting portions, said members having interengaging parts to align said members, said parts including struck-up parallel-sided projections on said members and extending radially of said members, and an apertured supporting member for one end of said series having radially extending grooves to receive and position the projecting aligning parts of the adjacent member.

ROYAL LEE.